United States Patent
Chen et al.

(10) Patent No.: US 10,949,271 B2
(45) Date of Patent: Mar. 16, 2021

(54) ENHANCED COPY-AND-PASTE

(71) Applicant: International Business Machines Corporation, Armonk, NY (US)

(72) Inventors: Dong Chen, Beijing (CN); Shao Jun Ding, Beijing (CN); Zhi Li Guan, Beijing (CN); Yang Liang, Beijing (CN); Xin Peng Liu, Beijing (CN); Ting Yin, Beijing (CN); Wu Mi Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 15/465,785

(22) Filed: Mar. 22, 2017

(65) Prior Publication Data

US 2018/0276057 A1    Sep. 27, 2018

(51) Int. Cl.
*G06F 9/54* (2006.01)
*H04L 29/08* (2006.01)

(52) U.S. Cl.
CPC .............. *G06F 9/543* (2013.01); *H04L 67/02* (2013.01)

(58) Field of Classification Search
CPC ........................................................ G06F 9/543
See application file for complete search history.

(56) References Cited

U.S. PATENT DOCUMENTS

| | | | |
|---|---|---|---|
| 9,092,121 B2 | 7/2015 | Albouyeh et al. | |
| 2004/0226012 A1* | 11/2004 | Awada | G06F 3/04842 718/100 |
| 2005/0154994 A1* | 7/2005 | Chen | G06F 40/166 715/770 |
| 2006/0075353 A1* | 4/2006 | DeSpain | G06F 17/24 715/770 |
| 2008/0141136 A1* | 6/2008 | Ozzie | G08B 21/22 715/723 |

(Continued)

OTHER PUBLICATIONS

Christopher Rini, Microsoft Oneclip: Cut & Paste in the Cloud, Jun. 1, 2015, Retrieved from Internet: URL: https://cgnet.com/microsoft-oneclip-cut-paste-in-the-cloud/, 3 pages.

(Continued)

*Primary Examiner* — Christopher J Fibbi
(74) *Attorney, Agent, or Firm* — Schmeiser, Olsen & Watts; Brian M. Restauro

(57) ABSTRACT

An enhanced copy-and-paste function copies multiple logical and physical software objects from a source computing environment to a distinct target computing environment. A physical object can be any software-data entity, such as a document, a container, a database, or a disk image. A logical object contains a hierarchy of two or more physical or logical objects. Objects are copied to a logical copy clipboard, where they may be assembled into logical objects. Each physical object is then transferred one at a time to a conventional physical clipboard, transmitted to a corresponding physical clipboard in a corresponding target environment, and then forwarded to a logical paste clipboard, where the original logical objects are reconstructed and pasted into the target environment. Each logical object may be pasted into multiple target environments and may contain physical objects copied from multiple source environments. Multiple logical objects may contain the same physical object.

19 Claims, 4 Drawing Sheets

(56) References Cited

U.S. PATENT DOCUMENTS

| | | | |
|---|---|---|---|
| 2009/0100503 A1* | 4/2009 | Doyle | G06F 21/31 |
| | | | 726/3 |
| 2012/0096368 A1* | 4/2012 | McDowell | G06F 9/543 |
| | | | 715/748 |
| 2013/0013986 A1 | 1/2013 | Kim | |
| 2013/0054731 A1* | 2/2013 | Branton | G06F 9/543 |
| | | | 709/213 |
| 2013/0304815 A1* | 11/2013 | Puente | H04L 67/10 |
| | | | 709/204 |
| 2014/0280132 A1* | 9/2014 | Auger | G06F 9/543 |
| | | | 707/736 |
| 2015/0095795 A1 | 4/2015 | Zhang | |
| 2015/0095796 A1* | 4/2015 | Kutz | G06F 16/27 |
| | | | 715/748 |
| 2016/0062613 A1 | 3/2016 | Lee | |
| 2018/0255134 A1* | 9/2018 | Goli | H04L 67/1095 |

OTHER PUBLICATIONS

Dann Berg, Copy and Paste Instantly Between All Your Devices With Clippick, Mar. 12, 2013, Retrieved from Internet: URL: http://www.laptopmag.com/articles/copy-and-paste-instantly-between-all-your-devices-with-clippick, 8 pages.

* cited by examiner

ENHANCED COPY-AND-PASTE

BACKGROUND

The present invention relates to computerized copy-and-paste functionality and specifically to a class of enhanced copy-and-paste operations capable of copy and pasting generalized classes of objects across disparate domains.

A conventional copy-and-paste operation allows users to copy an object from one location to another. Even if the source and target instances of the copied object reside in different operating environments or applications, they both share the same class or type of object. For example, a string of text characters may be copied from a secured read-only document compatible with a content-distribution application like an ebook-reader, and copied to an editable format, such as a word-processing document. However, although the two instances may not share certain attributes, such as write-protection, the both instances are text objects.

SUMMARY

An embodiment of the present invention provides an enhanced copy-and-paste system comprising a processor, a memory coupled to the processor, and a computer-readable hardware storage device coupled to the processor, the storage device containing program code configured to be run by the processor via the memory to implement a method for enhanced copy-and-paste functionality, the method comprising:

receiving a set of copy-and-paste instructions, where a first instruction of the set of copy-and-paste instructions identifies:

a first physical software object, a first source environment of a set of computerized environments, a first target environment of the set of computerized environments, and a direction to copy the first physical software object from the first source environment and to then paste the first physical software object into the first target environment;

copying the first physical software object to a logical copy clipboard capable of simultaneously storing multiple logical objects and multiple physical objects, where a logical object comprises an organization of two or more logical or physical software objects;

organizing a subset of the software objects stored in the logical copy clipboard into one or more logical objects; and pasting an instance of each object stored in the logical copy clipboard into one or more target paste environments of the set of computerized environments, where the set of copy-and-paste instructions determines which pasted objects are pasted into each target paste environment of the set of computerized environments.

Another embodiment of the present invention provides a method for enhanced copy-and-paste, the method comprising:

receiving a set of copy-and-paste instructions, where a first instruction of the set of copy-and-paste instructions identifies:

a first physical software object, a first source environment of a set of computerized environments, a first target environment of the set of computerized environments, and a direction to copy the first physical software object from the first source environment and to then paste the first physical software object into the first target environment;

copying the first physical software object to a logical copy clipboard capable of simultaneously storing multiple logical objects and multiple physical objects, where a logical object comprises an organization of two or more logical or physical software objects;

organizing a subset of the software objects stored in the logical copy clipboard into one or more logical objects; and pasting an instance of each object stored in the logical copy clipboard into one or more target paste environments of the set of computerized environments, where the set of copy-and-paste instructions determines which pasted objects are pasted into each target paste environment of the set of computerized environments.

Yet another embodiment of the present invention provides a computer program product, comprising a computer-readable hardware storage device having a computer-readable program code stored therein, the program code configured to be executed by an enhanced copy-and-paste system comprising a processor, a memory coupled to the processor, and a computer-readable hardware storage device coupled to the processor, the storage device containing program code configured to be run by the processor via the memory to implement a method for enhanced copy-and-paste functionality, the method comprising:

receiving a set of copy-and-paste instructions, where a first instruction of the set of copy-and-paste instructions identifies:

a first physical software object, a first source environment of a set of computerized environments, a first target environment of the set of computerized environments, and a direction to copy the first physical software object from the first source environment and to then paste the first physical software object into the first target environment;

copying the first physical software object to a logical copy clipboard capable of simultaneously storing multiple logical objects and multiple physical objects, where a logical object comprises an organization of two or more logical or physical software objects;

organizing a subset of the software objects stored in the logical copy clipboard into one or more logical objects; and pasting an instance of each object stored in the logical copy clipboard into one or more target paste environments of the set of computerized environments, where the set of copy-and-paste instructions determines which pasted objects are pasted into each target paste environment of the set of computerized environments.

DETAILED DESCRIPTION

Figure 1:
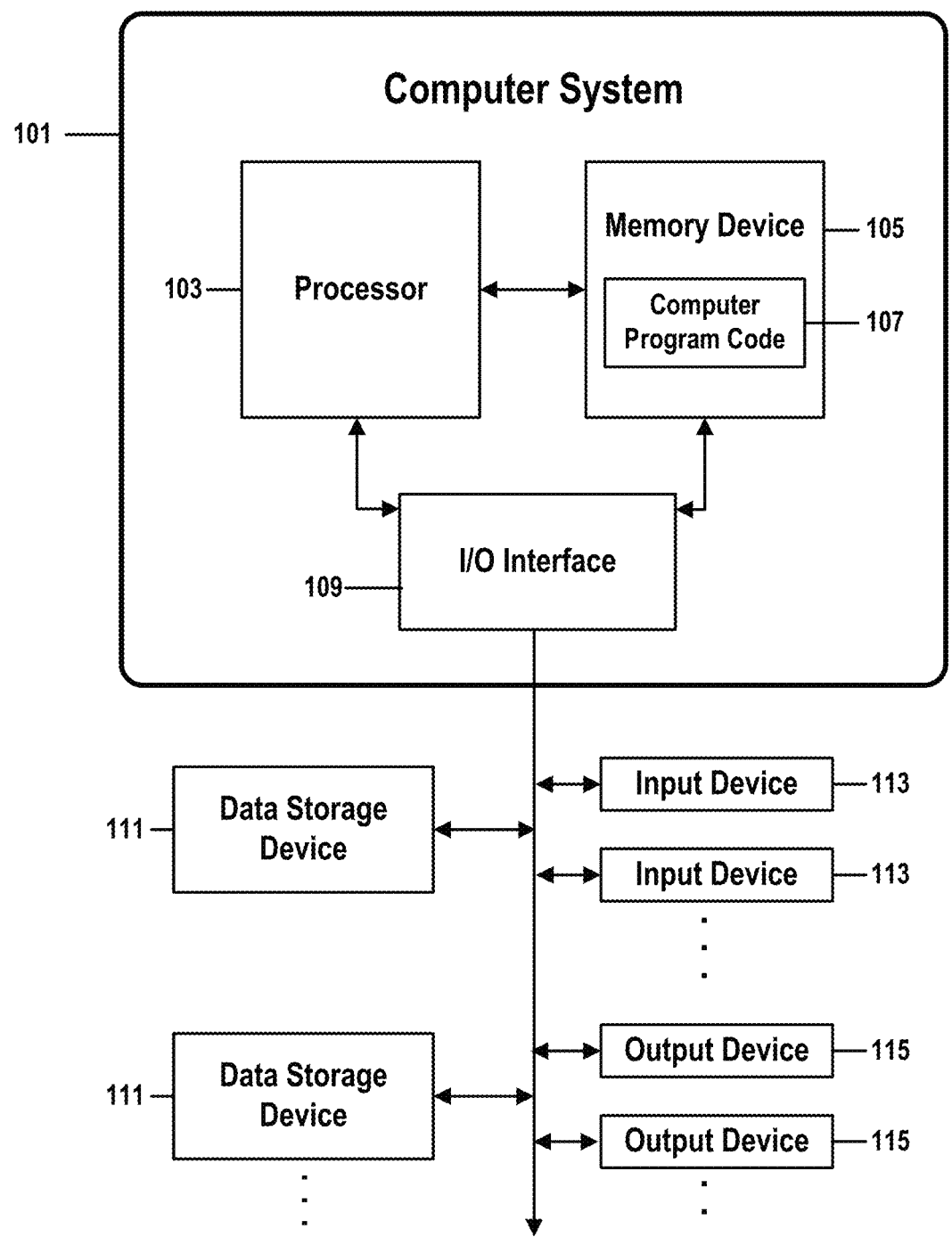
FIG. 1 shows the structure of a computer system and computer program code that may be used to implement a method for enhanced copy-and-paste in accordance with embodiments of the present invention.

The present invention provides an enhancement to conventional computerized copy-and-paste functionality. In particular, the present invention is capable of copying multiple, physically distinct, software objects and then pasting various logical combinations of those objects, even if those objects are complex objects that are in turn composed of other software objects, or if the objects have different types, classes, or data formats. The present invention is also capable of duplicating subsets of copied software objects across a generalized set of platforms, applications, content-storage formats, or environments.

The present invention can, for example, copy objects from one or more source containers, hosted by one or more source virtualized environments, to one or more target containers hosted by one or more other target virtualized environments. Such functionality may, for example, allow a system administrator to copy multiple log files, each compatible with a different application running in a different container, organizing the copied logs into one or more aggregated log files that are each compatible with a back-end cloud-management system running on a different platform, and then pasting those aggregated files to those other platforms.

The present invention thus provides technical solutions to two types of technical problems that are necessarily rooted in computer technology. One of these technical problems is caused by incompatibilities among software objects that prevent conventional copy-and-paste methodologies from simultaneously duplicating different types of objects. Another technical problem is caused by incompatibilities between computing platforms capable of hosting such software objects. The present invention provides technical solutions to both these technical problems by offering generalized enhanced copy-and-paste functionality that allows multiple, disparate, and complex software objects to be copied across multiple physical and virtual domains.

Examples and embodiments of the present invention that are described in this document may comprise touch-sensitive input devices, such as touchscreen-equipped mobile devices or desktop computers configured with touchscreen monitors. Embodiments of the present invention are not limited to such devices and input methodologies, however, and may be implemented on any platform, and by means of any hardware or software, capable of allowing users to perform steps of methods described in this document.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for enhanced copy-and-paste in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for enhanced copy-and-paste in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for enhanced copy-and-paste.

Any of the components of the present invention could be created, integrated, hosted, maintained, deployed, managed, serviced, supported, etc. by a service provider who offers to facilitate a method for enhanced copy-and-paste. Thus the present invention discloses a process for deploying or integrating computing infrastructure, comprising integrating computer-readable code into the computer system 101, wherein the code in combination with the computer system 101 is capable of performing a method for enhanced copy-and-paste.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for enhanced copy-and-paste may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for enhanced copy-and-paste is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
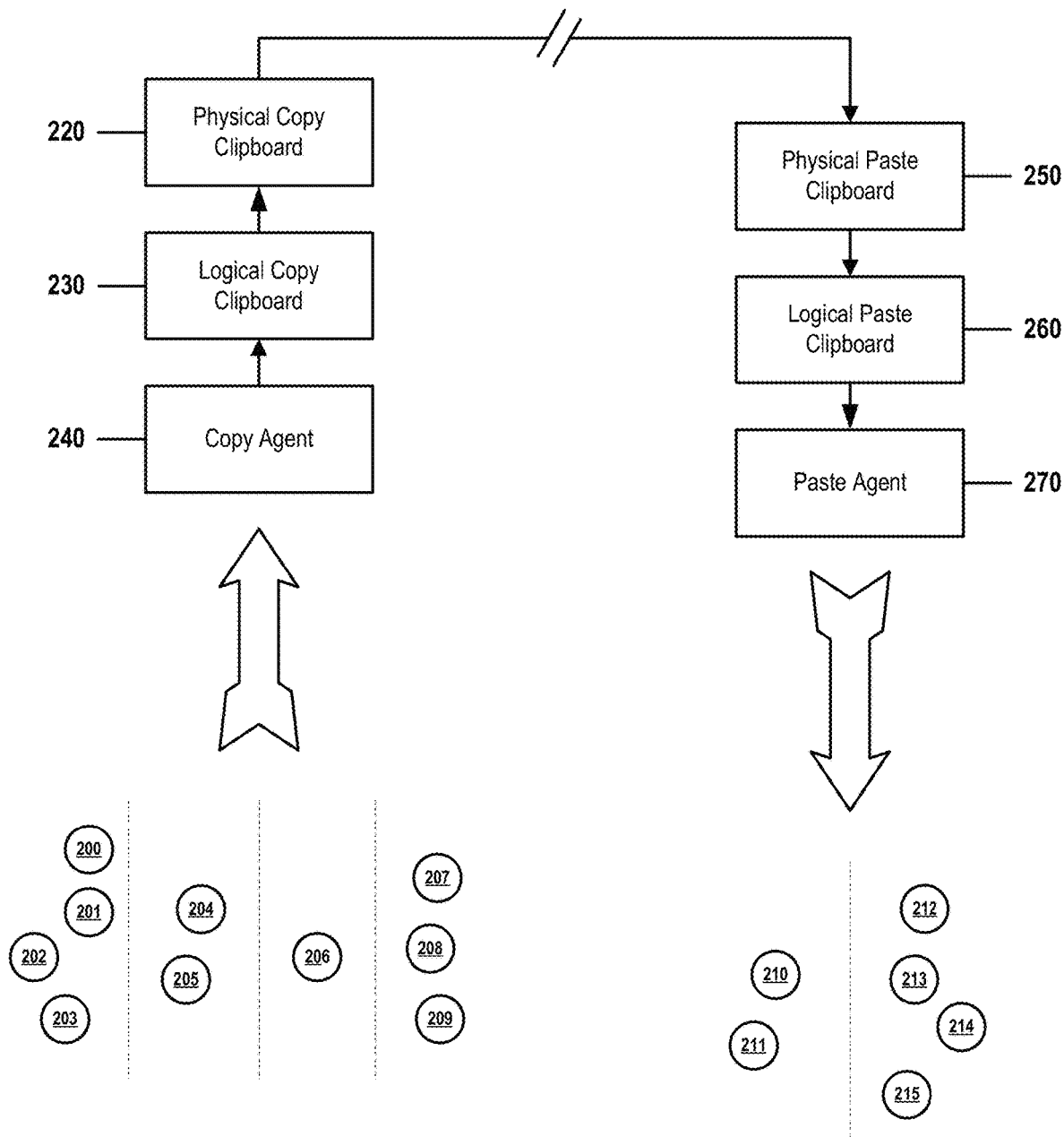
FIG. 2 is a structure diagram that shows components of a method for enhanced copy-and-paste in accordance with embodiments of the present invention.

FIG. 2 is a structure diagram that shows components of a method for enhanced copy-and-paste in accordance with embodiments of the present invention. FIG. 2 shows elements identified by reference numbers 200-270.

Items 200-209 are source software objects that are to be copied from a set of source computing environments to a set of target computing environments. In this example, items 200-203 are shown to be in a first source environment, objects 204-205 in a second source environment, object 206 in a third source environment, and objects 207-209 in a fourth source environment. These environments may comprise any sort of real, virtual, cloud, or other type of computing environment known in the art. Such environments may, for example, comprise a container of a cloud-computing platform, a smartphone, a desktop computer, a tablet, a smart television, an Internet-of-Things connected device, an enterprise network, a local-area network, or a notebook computer.

Each of these objects may be a "physical" object or a "logical" object. In this document, a physical object is a simple software object that can be recognized, managed, or operated by a single program. A logical object, on the other hand, is an object that may be managed by multiple management units that may be hosted by more than one operating environment. A logical object may comprise multiple, disparate physical objects, each of which can be managed by a different type of application or management system, and each of which may be hosted by a different platform.

One example of a physical object might be a virtual storage volume allocated to a specific virtual machine and managed in a virtualized cloud-computing environment by a disk-management component of the virtual environment's cloud-management system. Other examples comprise a stored computer data file managed by a file-management component of a host operating system and a virtual machine managed by a cloud-management system of the host operating system.

A logical object, however, could comprise both the stored data file and the virtual machine. In such an example, these two physical objects cannot be recognized or managed by the same management entity.

Unlike a physical object, a logical object may comprise hierarchies or nested levels of physical and logical objects, such as a virtual machine and a file stored on a virtual hard drive of that virtual machine.

Item 240 is a copy agent comprised by embodiments of the present invention. This software module or other computerized component may perform functions of a user interface and other logical operations required to permit a user to direct desired copy-and-paste operations.

In particular, the copy agent is capable of receiving from a user identifications of physical objects that the user wishes to copy from source computing environments or platforms and paste to target computing environments or platforms. These identifications may also specify that certain subsets of the copied physical objects should be organized into logical objects, each of which is capable of being pasted to a different target.

Figure 3:
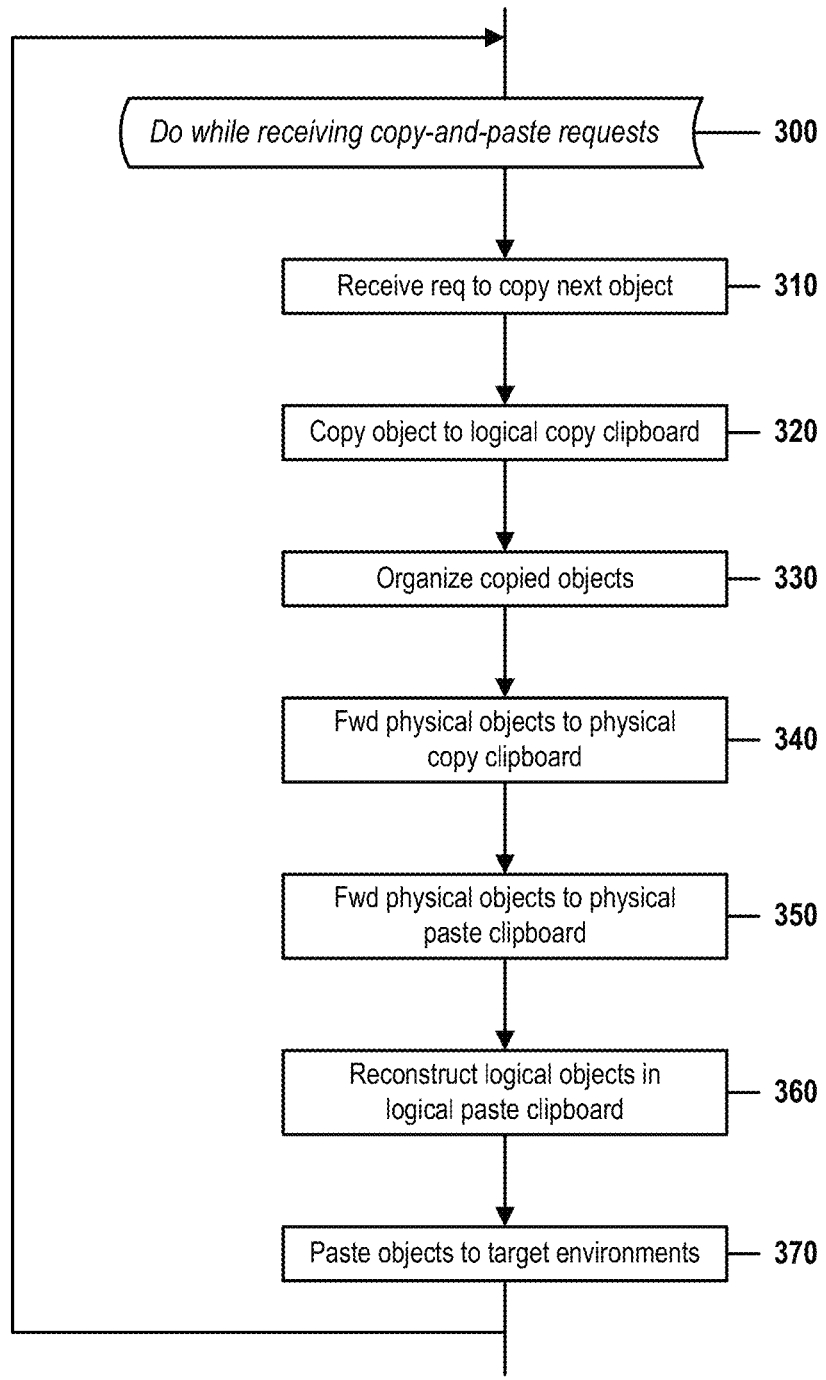
FIG. 3 is a flow chart that illustrates the steps of a method for enhanced copy-and-paste in accordance with embodiments of the present invention.
Figure 4:
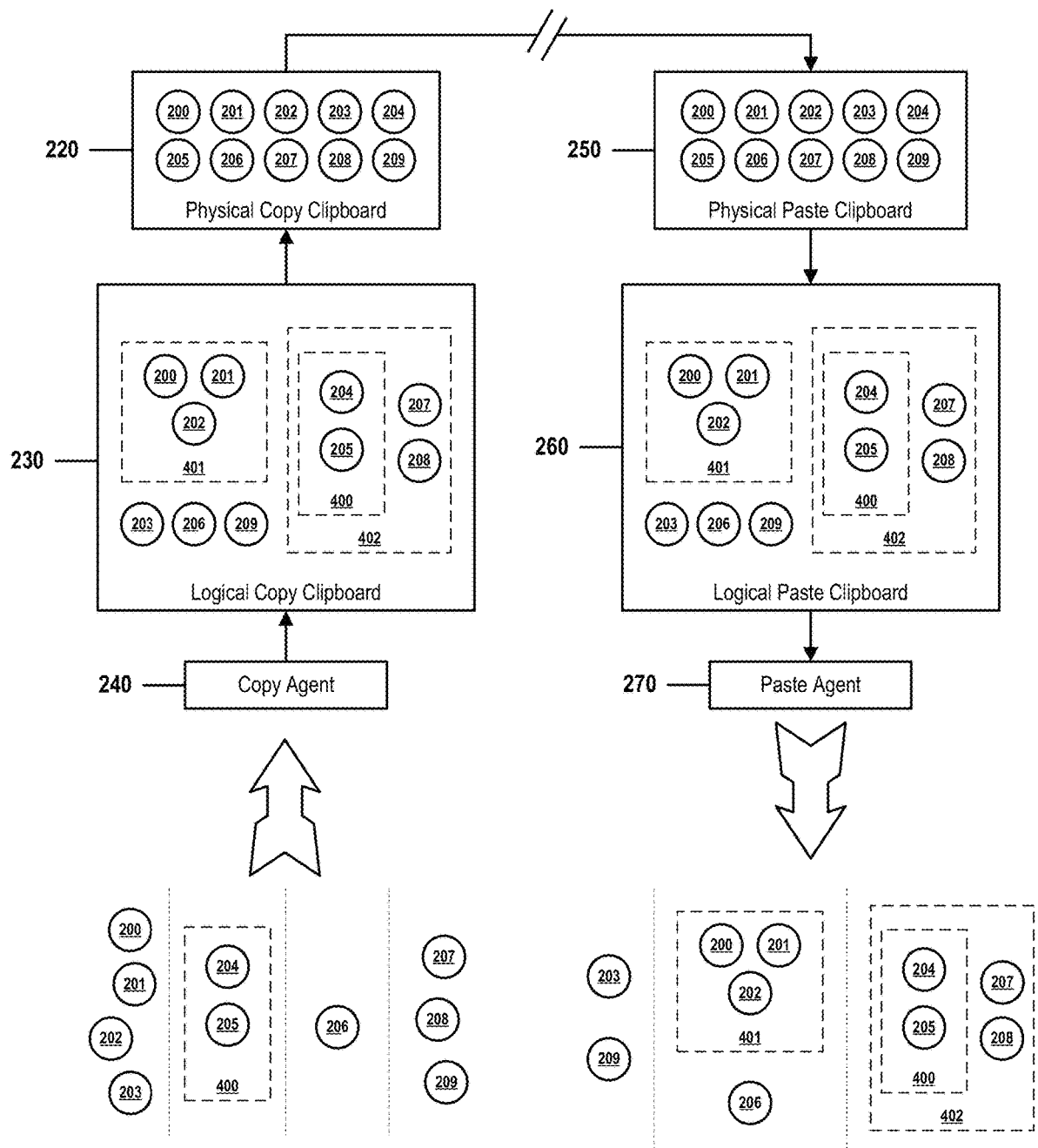
FIG. 4 shows results produced by an exemplary real-world embodiment of the present invention.

Item 230 is a logical "copy" clipboard that is unique to embodiments of the present invention. As shown in FIGS. 3-4, this logical copy clipboard 230 is capable of storing multiple physical and logical objects. Each stored logical object is in turn capable of comprising two or more physical or logical objects and may organize those stored objects into a hierarchical structure.

Item 220 is a physical "copy" clipboard used to facilitate the copying functionality of the present invention. In some embodiments, this physical copy clipboard 220 is similar or identical to a conventional clipboard, such as the clipboards built into popular desktop-computer and mobile-device operating systems. This physical copy clipboard 220 can receive physical objects from the logical copy clipboard 230, but can store, even temporarily, only one physical object at a time.

Items 200-209 and 220-240 may all reside in or be hosted by the same computing environment or operating system. Together, they implement the copying functionality of the present invention. Items 211-212 and 250-270 comprise complementary pasting functionality of the present invention.

Item 250 is physical "paste" clipboard capable of receiving physical objects forwarded from the physical copy clipboard 220. Like the physical copy clipboard 220, the logical physical clipboard 250 may perform operations functionally similar to that of a conventional clipboard.

Physical objects may be passed from the physical copy clipboard 220 to the logical physical clipboard 250 by any means known in the art, such as by means of an Internet connection, a local-area network, a virtual network of a cloud-computing environment, or as messages sent between pairs of applications.

Item 260 is a logical "paste" clipboard similar in operation to the logical copy clipboard 230. Logical paste clipboard 260 may aggregate, organize, and store subsets of physical objects copied by modules 220-240 and forwarded from source computing platforms to target computing platforms via communications between the physical copy clipboard s 220 and the logical physical clipboard s 250.

Item 270 is a paste agent that pastes physical and logical objects stored in the logical paste clipboard 260. In the example of FIG. 2, the ten source objects 200-209 have been copied from four source environments and pasted into two target environments as six physical and logical objects 210-215. Here, each pasted logical object may comprise two or more physical and logical objects.

Paste agent 270 may comprise a user interface and is capable of performing the intelligent pasting functions necessary to paste each physical and logical object stored in the logical paste clipboard 260 to each target environment specified by a user. In some cases, the agent 270 may paste one physical or logical object into more than one target environment, and in other cases, paste agent 270 may paste distinct logical objects that comprise overlapping subsets of the physical source objects 201-209. In general, embodiments of the present invention may paste any combination of copied source objects 201-209 into target environments as physical or logical target objects 210-215.

The physical copy clipboard 220 and logical physical clipboard 250 may be implemented as components of a centralized copy-and-paste application installed on a server or cloud-management platform, may be built into each user's local operating system, may be provisioned in a cloud-computing environment as a virtual machine or as a component of a virtual machine, or may be implemented by any other means known in the art. In some embodiments, each instance of a physical copy clipboard 220 may reside on a source computing environment or platform capable of hosting a physical source object 200-209, and each instance of a logical physical clipboard 250 may be reside on a target computing environment or platform capable of hosting a physical target object 210-215.

Item

In some embodiments, there may be only one distinct instance of each copy component 220-240. But other embodiments may comprise a distinct instance of copy agent 240 in each source computing environment or platform capable of hosting a source physical object 200-209. Some embodiments may comprise only one instance of logical copy clipboard 230 that is capable of receiving copied source physical objects 200-209 from one or more copy agents 240.

Similarly, in some embodiments, there may be only one distinct instance of each paste component 250-270. But other embodiments may comprise a distinct instance of paste agent 270 in each target computing environment or platform capable of hosting a pasted logical or physical object 210-215. Some embodiments may comprise only one instance of logical paste clipboard 260 that is capable of forwarding copied physical objects 210-215 to one or more paste agents 270 in one or more target environments or platforms.

FIG. 3 is a flow chart that illustrates the steps of a method for enhanced copy-and-paste in accordance with embodiments of the present invention. FIG. 3 contains steps 300-370. FIG. 4 provides a concrete example of a method of FIG. 3.

Step 300 begins a iterative procedure of steps 300-370, which may repeat indefinitely, or so long as the method of FIG. 3 continues to receive copy-and-paste requests from users.

The method of FIG. 3 is performed by an enhanced copy-and-paste system that may be implemented by means of any hardware, software, or integrated computer technology known in the art or described by an embodiment or example of this document. This system may include components shown in FIGS. 1 and 2, and may be implemented by means of a client-server architecture, as a cloud service, as a set of standalone user-resident software applications or modules, as a network-hosted application, or by means of any other architecture known in the art.

In some embodiments, the system will comprise a plug-in module or other module that interfaces with other applications or software systems accessible to a user in the user's operating environment. In other cases, the system will be under direct control of a user and will operate by interacting with similar or identical systems each under the control of another user. In yet other embodiments, instances of the system may each serve user requests originating in one possible source environment, or may each service one target environment capable of receiving objects to be pasted by the system.

In step 310, the copy agent 240 receives from a user a request to copy one or more physical or logical objects from the user's "source" computing environment or platform and to paste all or part of the copied object to one or more "target" computing environments or platforms.

This request may comprise an identification of the object or objects to be copied and metadata that describes characteristics of each object to be copied. These characteristics may identify a combination of:

one or more source environments or platforms from which each object is to be copied;
a data format, structure, type, or class of each object to be copied;
whether each object is a physical object or a logical object;
component logical or physical objects comprised by each identified logical object;
instructions, if any, for organizing objects to be pasted into one or more logical structures; and
one or more target environments or platforms into which each object is to be pasted.

In step 320, the copy agent 240 accesses and copies the objects identified by the user request received in step 310 to the logical copy clipboard 230.

In some cases, the objects identified in step 310 may in step 320 be added to objects already stored in the logical copy clipboard 230.

In step 330, the system or the copy agent 240 may reorganize two or more of the objects stored in the logical copy clipboard 230 into one or more logical objects that each comprises two or more other physical or logical objects. FIG. 4 describes a concrete example of such logical structures. The system performs this organization in response to receiving instructions in step 310 that describe how the requesting user requires the objects to be copied or pasted.

In step 340, the physical objects stored in the logical copy clipboard 230 are forwarded to a conventional physical clipboard 220. This clipboard may be similar to the simple clipboards known in the art today and employed by computer operating systems, office applications, mobile-device apps, and other types of known software components.

Although the logical copy clipboard 230 and the logical paste clipboard 260 can each store multiple logical and physical objects, the physical copy clipboard 220 and the physical paste clipboard 250 are each capable of storing and transferring only one physical object at a time.

Because a conventional clipboard 220 can store only one physical object at a time, step 340 may be repeated multiple times, each time forwarding a first physical object to the conventional physical copy clipboard 220, and then forwarding a second physical object only after the physical copy clipboard 220 has transferred the first object to the physical paste clipboard 250 in step 350.

Each physical object forwarded in step 340 may be either a standalone physical object previously copied to and stored in the logical copy clipboard 230 or may be a physical object comprised by a logical object that was either previously copied to the logical copy clipboard 230 or that was assembled by the system from previously copied physical and logical object in accordance with instructions received in step 310 and stored in the logical copy clipboard 230.

As new physical or logical objects are added to the logical copy clipboard 230, the logical arrangement of objects stored in the logical copy clipboard 230 may change. Instructions received by the user in step 310 may, for example, instruct the system to copy a new physical object and to paste that object as part of a new logical object that includes the new physical object, a previously copied physical object, and two previously copied logical objects. As mentioned above those two previously copied logical objects may in turn comprise additional nested levels of physical and logical objects.

Each new copy-and-paste instruction is thus capable of reorganizing previously organized logical and physical objects stored in the logical copy clipboard 230. In embodiments where multiple users share a same logical copy clipboard 230, this design may provide improved flexibility and collaborative functionality for teams of programmers, document editors, or system-maintenance specialists.

In some cases, a physical or logical object may be deleted from the logical copy clipboard 230 when the object is forwarded to the physical copy clipboard 220. In certain embodiments, when a logical object is forwarded to the physical copy clipboard 220, the logical organization that defines the logical structure may be deleted from the logical copy clipboard 230, but the physical objects comprised by the logical organization may be left intact.

In some embodiments, the system in step 340 may also forward instructions, identifications, or other guidelines that identify a logical structure of each object to be pasted and that identify one or more target environments or platforms to which each such object is to be pasted. Such instructions may be communicated to the logical paste clipboard 260 by any means known in the art, such as through an Internet connection or a local-area network. In some embodiments the otherwise-conventional physical copy clipboard 220 and physical paste clipboard 250 may be enhanced such that the two physical clipboards 220 and 250 are capable of communicating such instructions without requiring additional network resources.

It may be possible to paste multiple copies of an object to a single target environment or to multiple target environments. It may also be possible to paste multiple logical objects that in aggregate comprise more than one instance of the same physical or logical object.

In step 350, the physical copy clipboard 220 forwards a physical object stored by the physical copy clipboard 220 to a physical paste clipboard 250. This forwarding may be performed through any means known in the art, such as by means of a local-area network, by system calls to a cloud-management platform, or by passing the object as part of a transaction or message between applications.

When the system intends to paste a logical object stored in the logical copy clipboard 230, steps 340 and 350 may be performed for each physical object comprised by the logical object. Those physical objects may then be forwarded one at a time to the logical paste clipboard 260, where they will be aggregated and reorganized into logical objects, as required in order to satisfy the user request received in step 310.

In other words, logical copy clipboard 230 may in some cases act in a manner reminiscent of a buffer, storing logical and physical objects to be pasted, and then sequentially forwarding each physical object to be pasted (either as a standalone physical object or as part of a logical object) to a conventional physical copy clipboard 220. They physical copy clipboard 220 and physical paste clipboard 250 then operate in a conventional manner, receiving and forwarding physical software objects one at a time.

In step 360, the logical paste clipboard 260 receives from the physical paste clipboard 250 physical objects one at a time. The logical paste clipboard 260, following instructions comprised by the user request received in step 310 and possibly updated by the logical copy clipboard 230, then reassembles the received physical objects into a set of physical and logical objects to be pasted.

In simpler embodiments, the reassembled physical and logical objects to be pasted are identical to those created by the logical copy clipboard 230 in step 330. In embodiments that comprise multiple copying users or more extensive concurrency capabilities, the physical and logical objects assembled in the logical paste clipboard 260 may differ from those stored in the logical copy clipboard 230. This latter condition may, for example, occur when the logical paste clipboard 260 receives physical objects from a physical paste clipboard 250 capable of receiving physical objects and instructions from multiple source environments or multiple users. In such cases, the logical paste clipboard 260 may generate multiple logical objects that each contain overlapping subsets of the physical objects to be pasted.

In step 370, paste agent 270 completes the method of FIG. 3 by pasting the logical and physical objects reassembled in the logical paste clipboard into one or more target environments or platforms. As mentioned above, the paste agent 270 determines which logical and physical objects to paste to each target environment, and how to organize the objects to be pasted, as a function of instructions comprised by the user request received in step 310. In some embodiments, those original user-requested instructions may be further modified by previously or subsequently received copy-and-paste requests by the same user or different users. Those previously or subsequently received requests may originate from different source computing environments or platforms and may identify objects located in different source computing environments or platforms.

In some embodiments, pasting an object may comprise automatically converting the object to a different data structure, data type, or data format, or truncating or otherwise modifying the content of or a characteristic of the object. This may be necessary when, for example, a target computing environment is in some way incompatible with a format or other characteristic of an object pasted into the target computing environment.

In some cases, it may for the same reason be impossible to paste an object into a requested target environment. It may, for example, be impossible to paste a JPEG image into a text-only text editing application.

But there are many other cases where an automatic conversion, performed by any means known in the art, allows complex objects to be copied and pasted between an otherwise-incompatible source and target. For example, a disk image formatted with FAT32 clusters may be automatically converted to an EXT4 format when being copied from a Windows environment to a Linux environment. Similarly, a formatted disk provisioned as a VMDK-compliant virtual resource of one virtualized operating environment may be converted to a VDI format when pasted to a target environment that conforms to a different vendor's proprietary formats.

In more advanced or platform-specific embodiments, an application may be transferred between different operating systems by automatically recompiling the application's source code during before pasting the application into its target operating system. Such embodiments may be useful when copying applications that are sensitive to their runtime environments, such as many applications originally coded in the C or C++ programming languages. When copying and pasting a binary executable of an application, such automated recompilation may be possible by automatically downloading the application's source code from a predefined repository or source codes, runtime libraries, or other resources needed to implement such features. In other embodiments, such automated conversion may be possible by means of a repository that contains equivalent, precompiled binary executables of applications likely to be copied and pasted between different types of environments. For example, a repository may comprise versions of a popular cross-platform word processor that are each compatible with one major operating system.

At the conclusion of step 370, one or more physical or logical objects will have been copied from one or more source computing environments or platforms to one or more target environments or platforms. The iterative procedure of steps 300-370 will begin its next iteration when another user copy-and-paste request is received.

In some embodiments, the logical copy clipboard 230 will be left in its current state during the next iteration of the procedure of steps 300-370, allowing the next-received user request to add more logical or physical objects to the logical copy clipboard 230, or to identify more copy-and-paste instructions that may be implemented by reorganizing all or part of the current contents of the logical copy clipboard 230.

FIG. 4 shows results produced by an exemplary real-world embodiment of the present invention. FIG. 2 shows elements identified by reference numbers 200-270 and 400-402.

FIG. 4. Items 200-209 and 220-270 are similar in form and function to identically numbered items of FIG. 2. FIG. 4, however, further illustrates logical objects formed by organizing certain of the physical objects 200-209 into logical objects 400-402.

In the example of FIG. 4, one or more users, in four source computing environments or platforms, submit copy-and-paste requests to their respective copy agents. These requests are directed toward ten physical objects 200-209. Physical objects 200-203 are copied from a first source environment, physical objects 204-205 are copied from a second source environment, physical object 206 is copied from a third source environment, and physical objects 207-209 are copied from a fourth source environment. Physical objects 204 and 205 are organized within the second source environment into a logical object 400.

Copy agent 240 receives these requests, identifies each physical or logical object 200-209 and 400 to be copied and loads those objects 200-209 and 400 into logical copy clipboard 230. The copied objects are organized in the logical copy clipboard 230 into logical objects identified by instructions comprised by the user requests. One copy-and-paste request might, for example, request that a cloud container, an application hosted by the container, and two application-dependent documents hosted by the container be copied and pasted to one target environment as a single logical object, and that the two documents, along with a third, previously copied document, also be pasted to another target environment as another logical object.

In the example of FIG. 4, physical objects 200-202 are assembled into a first logical object 401 and then stored as a single logical object 401 in the logical copy clipboard 230. Similarly, logical object 400 and physical objects 207 and 208 are assembled into another logical object 402 and again stored in the logical copy clipboard 230. User-requested copy-and-paste requests do not require physical objects 203, 206, and 209 to be combined into a logical object, so those three objects are stored in the logical copy clipboard 230 as three distinct physical objects.

The system then sequentially forwards each of the ten physical objects 200-209 one at a time to the physical copy clipboard 220. The system also sends to the logical paste clipboard 260 instructions necessary to reconstruct the logical arrangements of the physical objects stored in the logical copy clipboard 230, along with further instructions about where or how to paste each object. These instructions may be transmitted through the physical copy clipboard 220 in embodiments that enhance the physical copy clipboard 220 to be capable of transmitting such instructions. In other embodiments, however, these instructions may be transmitted by conventional means, such as by a network connection. In embodiments where copy and paste functionalities are comprised by a same application, these instructions may already be known by the logical paste clipboard 260 or the paste agent 270.

Regardless of the exact method of transmission of instructions, the physical objects 200-209 sequentially forwarded to the physical copy clipboard 220 are sequentially forwarded to the physical paste clipboard one at a time, such that, at any given time, there is at most one physical object resident in the physical copy clipboard 220 and one physical object resident in the physical paste clipboard 250.

This implementation allows the present invention to be implemented without requiring significant modification to an existing conventional pair of clipboards, such as those used by a conventional copy-and-paste function. In other words, the present invention passes, between enhanced copy and enhanced paste modules, information about complex, logical objects to be pasted across domains by flattening the data structures 400-402 stored in the logical clipboards 230 and 260 into a sequential stream of physical objects 200-209 capable of being passed sequentially through the conventional physical clipboards 220 and 250.

The enhanced paste functionality of the present invention is performed by reversing this procedure. Using the instructions received from the copy agent 240 or from the logical copy clipboard 230, the paste agent 270 or logical paste clipboard 260 reassembles the physical objects 200-209 received one at a time from the physical paste clipboard 250 into logical objects 400-402 similar to those stored in the logical copy clipboard 230.

The paste agent 270 then pastes each of these reconstructed logical objects 401-402 and physical objects 203, 206, and 209 into each of the target environments identified by the received instructions. In the example of FIG. 4, physical objects 203 and 209 are pasted into a first target environment or platform, logical object 401 and physical object 206 are pasted into a second target environment or platform, and logical object 402 is pasted into a third target environment or platform.

What is claimed is:

1. An enhanced copy-and-paste system comprising a processor, a memory coupled to the processor, and a computer-readable hardware storage device coupled to the processor, the storage device containing program code configured to be run by the processor via the memory to implement a method for enhanced copy-and-paste functionality, the method comprising:
   receiving a copy-and-paste instruction requesting that a combination of multiple logical objects and multiple physical software objects be copied from a first source environment of a set of computerized environments and pasted to a first target environment of the set of computerized environments,
   where each environment of the set of computerized environments is selected from the group consisting of: a cloud-based container, a smartphone, a tablet, a desktop computer, an Internet-of-Things-connected device, an enterprise network, a local-area network, and a notebook computer,
   where a physical software object is a software object that can be managed by only one corresponding type of application software,
   where a logical object is a hierarchical data structure that consists of at least two software objects selected from the group consisting of physical software objects and logical objects,
   where two physical software objects comprised by a single logical object are each managed by a different type of application software, and
   where the combination of objects to be copied and pasted passes sequentially through a four-buffer structure that consists of:
      a logical copy clipboard, located in the first source environment, that is capable of simultaneously storing the entire combination of objects, either in the original form of the combination or as a single logical object that consists of all logical and physical objects of the combination,
      a physical copy clipboard, located in the first source environment, that is capable of storing only one physical software object at a time, and that directly receives from the logical copy clipboard a serial sequence of software objects, where the serial sequence of software objects consists of all physical software objects comprised by the single logical object,
      a physical paste clipboard, located in the first target environment, that is capable of storing only one physical software object at a time, and that directly receives from the physical copy clipboard the serial sequence of software objects, and
      a logical paste clipboard, located in the first target environment, that is capable of storing the combination of objects in the original form of the combination, and that reassembles the sequentially transferred physical software objects, directly received from the physical paste clipboard, into the single logical object and then directly pastes the combination of objects from the reassembled single logical object into the first target environment, where the pasted objects are pasted in the original form of the combination.

2. The system of claim 1, further comprising:
receiving a second instruction of the set of copy-and-paste instructions, where the second instruction identifies:
   a second logical object,
   a second source environment of the set of computerized environments,
   a second target environment of the set of computerized environments, and
   a direction to copy the second logical object from the second source environment and to then paste the second logical object into the second target environment; and
copying, to the logical copy clipboard, the second logical object and the physical software objects comprised by the second logical object.

3. The system of claim 2, further comprising:
receiving a third instruction of the set of copy-and-paste instructions; and
reorganizing, in response to the receiving the third instruction, a third logical object stored in the logical copy clipboard.

4. The system of claim 1, where component objects comprised by a stored logical object stored in the logical copy clipboard were originally copied from more than one source environment of the set of computerized environments.

5. The system of claim 1,
   where a fourth received instruction of the set of copy-and-paste instructions is capable of further identifying an additional command to paste a logical paste object that comprises a physical or logical object identified by the fourth received instruction, and
   where the logical paste object comprises at least one physical object of the combination of objects.

6. The system of claim 1,
   where the first source environment and the first target environment are cloud-computing environments, and
   where the first physical object is a virtualized resource of a cloud-computing environment.

7. A method for enhanced copy-and-paste, the method comprising:

receiving a copy-and-paste instruction requesting that a combination of multiple logical objects and multiple physical software objects be copied from a first source environment of a set of computerized environments and pasted to a first target environment of the set of computerized environments,
  where each environment of the set of computerized environments is selected from the group consisting of: a cloud-based container, a smartphone, a tablet, a desktop computer, an Internet-of-Things-connected device, an enterprise network, a local-area network, and a notebook computer,
  where a physical software object is a software object that can be managed by only one corresponding type of application software,
  where a logical object is a hierarchical data structure that consists of at least two software objects selected from the group consisting of physical software objects and logical objects,
  where two physical software objects comprised by a single logical object are each managed by a different type of application software, and
  where the combination of objects to be copied and pasted passes sequentially through a four-buffer structure that consists of:
    a logical copy clipboard, located in the first source environment, that is capable of simultaneously storing the entire combination of objects, either in the original form of the combination or as a single logical object that consists of all logical and physical objects of the combination,
    a physical copy clipboard, located in the first source environment, that is capable of storing only one physical software object at a time, and that directly receives from the logical copy clipboard a serial sequence of software objects, where the serial sequence of software objects consists of all physical software objects comprised by the single logical object,
    a physical paste clipboard, located in the first target environment, that is capable of storing only one physical software object at a time, and that directly receives from the physical copy clipboard the serial sequence of software objects, and
    a logical paste clipboard, located in the first target environment, that is capable of storing the combination of objects in the original form of the combination, and that reassembles the sequentially transferred physical software objects, directly received from the physical paste clipboard, into the single logical object and then directly pastes the combination of objects from the reassembled single logical object into the first target environment, where the pasted objects are pasted in the original form of the combination.

8. The method of claim 7, further comprising:
receiving a second instruction of the set of copy-and-paste instructions, where the second instruction identifies:
  a second logical object,
  a second source environment of the set of computerized environments,
  a second target environment of the set of computerized environments, and
  a direction to copy the second logical object from the second source environment and to then paste the second logical object into the second target environment; and
  copying, to the logical copy clipboard, the second logical object and the physical software objects comprised by the second logical object.

9. The method of claim 8, further comprising:
receiving a third instruction of the set of copy-and-paste instructions; and
reorganizing, in response to the receiving the third instruction, a third logical object stored in the logical copy clipboard.

10. The method of claim 7, where component objects comprised by a stored logical object stored in the logical copy clipboard were originally copied from more than one source environment of the set of computerized environments.

11. The method of claim 7,
  where a fourth received instruction of the set of copy-and-paste instructions is capable of further identifying an additional command to paste a logical paste object that comprises a physical or logical object identified by the fourth received instruction, and
  where the logical paste object comprises at least one physical object of the combination of objects.

12. The method of claim 7, further comprising providing at least one support service for at least one of creating, integrating, hosting, maintaining, and deploying computer-readable program code in the computer system, wherein the computer-readable program code in combination with the computer system is configured to implement the receiving, the copying, the organizing, and the pasting.

13. The method of claim 7,
  where the first source environment and the first target environment are cloud-computing environments, and
  where the first physical object is a virtualized resource of a cloud-computing environment.

14. A computer program product, comprising a computer-readable hardware storage device having a computer-readable program code stored therein, the program code configured to be executed by an enhanced copy-and-paste system comprising a processor, a memory coupled to the processor, and a computer-readable hardware storage device coupled to the processor, the storage device containing program code configured to be run by the processor via the memory to implement a method for enhanced copy-and-paste functionality, the method comprising:
  receiving a copy-and-paste instruction requesting that a combination of multiple logical objects and multiple physical software objects be copied from a first source environment of a set of computerized environments and pasted to a first target environment of the set of computerized environments,
    where each environment of the set of computerized environments is selected from the group consisting of: a cloud-based container, a smartphone, a tablet, a desktop computer, an Internet-of-Things-connected device, an enterprise network, a local-area network, and a notebook computer,
    where a physical software object is a software object that can be managed by only one corresponding type of application software,
    where a logical object is a hierarchical data structure that consists of at least two software objects selected from the group consisting of physical software objects and logical objects,
    where two physical software objects comprised by a single logical object are each managed by a different type of application software, and where the combination of objects to be copied and pasted passes sequentially through a four-buffer structure that consists of:
- a logical copy clipboard, located in the first source environment, that is capable of simultaneously storing the entire combination of objects, either in the original form of the combination or as a single logical object that consists of all logical and physical objects of the combination,
- a physical copy clipboard, located in the first source environment, that is capable of storing only one physical software object at a time, and that directly receives from the logical copy clipboard a serial sequence of software objects, where the serial sequence of software objects consists of all physical software objects comprised by the single logical object,
- a physical paste clipboard, located in the first target environment, that is capable of storing only one physical software object at a time, and that directly receives from the physical copy clipboard the serial sequence of software objects, and
- a logical paste clipboard, located in the first target environment, that is capable of storing the combination of objects in the original form of the combination, and that reassembles the sequentially transferred physical software objects, directly received from the physical paste clipboard, into the single logical object and then directly pastes the combination of objects from the reassembled single logical object into the first target environment, where the pasted objects are pasted in the original form of the combination.

15. The computer program product of claim 14, further comprising:
receiving a second instruction of the set of copy-and-paste instructions, where the second instruction identifies:
- a second logical object,
- a second source environment of the set of computerized environments,
- a second target environment of the set of computerized environments, and
- a direction to copy the second logical object from the second source environment and to then paste the second logical object into the second target environment; and copying, to the logical copy clipboard, the second logical object and the physical software objects comprised by the second logical object.

16. The computer program product of claim 15, further comprising:
receiving a third instruction of the set of copy-and-paste instructions; and
reorganizing, in response to the receiving the third instruction, a third logical object stored in the logical copy clipboard.

17. The computer program product of claim 14, where component objects comprised by a stored logical object stored in the logical copy clipboard were originally copied from more than one source environment of the set of computerized environments.

18. The computer program product of claim 14,
where a fourth received instruction of the set of copy-and-paste instructions is capable of further identifying an additional command to paste a logical paste object that comprises a physical or logical object identified by the fourth received instruction, and
where the logical paste object comprises at least one physical object of the combination of objects.

19. The computer program product of claim 14,
where the first source environment and the first target environment are cloud-computing environments, and
where the first physical object is a virtualized resource of a cloud-computing environment.

\* \* \* \* \*